United States Patent
Raja et al.

(10) Patent No.: US 11,191,683 B2
(45) Date of Patent: Dec. 7, 2021

(54) ELECTRIC VEHICLE WITH MOVABLE BAGGAGE BASE

(71) Applicant: SUZUKI MOTOR CORPORATION, Hamamatsu (JP)

(72) Inventors: Gopinath Raja, Hamamatsu (JP); Masayoshi Wada, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 202 days.

(21) Appl. No.: 16/593,686

(22) Filed: Oct. 4, 2019

(65) Prior Publication Data
US 2020/0315876 A1    Oct. 8, 2020

(30) Foreign Application Priority Data
Apr. 5, 2019   (JP) .................................. 2019-072869

(51) Int. Cl.
*A61G 5/04*    (2013.01)
*A61G 3/00*    (2006.01)
(Continued)

(52) U.S. Cl.
CPC .............. *A61G 5/041* (2013.01); *A61G 3/005* (2013.01); *A61G 5/1067* (2013.01); *A61H 2003/043* (2013.01); *B62B 2206/02* (2013.01)

(58) Field of Classification Search
CPC ........ A61G 5/04; A61G 5/041; A61G 5/0833; A61G 5/125; A61G 5/1067; A61G 5/085;
(Continued)

(56) References Cited

U.S. PATENT DOCUMENTS

| 5,137,102 A | * | 8/1992 | Houston, Sr. .......... A61G 5/042 180/65.51 |
| 5,605,345 A | * | 2/1997 | Erfurth ..................... A61G 5/08 135/67 |

(Continued)

FOREIGN PATENT DOCUMENTS

| DE | 202012102516 U1 | * | 8/2012 | ............. B62B 3/022 |
| GB | 2559786 A | * | 8/2018 | ............... A61G 5/04 |

(Continued)

OTHER PUBLICATIONS

Suzuki exhibits the concept model "kupo" at "2020, Shibuya. Let's experience the daily life of super welfare", Development of a walking assistance vehicle with the function of an electric wheelchair. URL: https://www.suzuki.co.jp/release/c/2018/1102/, Nov. 2, 2018, Publisher: Suzuki Motor Corporation.

*Primary Examiner* — Steve Clemmons
(74) *Attorney, Agent, or Firm* — Cozen O'Connor

(57) ABSTRACT

The electric vehicle according to the present invention includes a moving base capable of traveling by electromotive drive, a seat including a seating part having a seating surface and disposed on the moving base, and a back plate used as a seat back corresponding to the seating surface and disposed on the moving base, the seat can move between a seating position with the seating surface facing upward, and a retracting position with the seating part retracted forward from the seating position, the back plate can be moved between a standing-up position located rearward and upward with respect to the seating part of the seat when at the seating position, and a lying-down position located forward of the standing-up position, and the back plate includes a baggage carrier formed on a back surface facing upward when at the lying-down position and allowing baggage to be placed thereon.

7 Claims, 5 Drawing Sheets

(51) Int. Cl.
*A61H 3/04* (2006.01)
*A61G 5/10* (2006.01)

(58) Field of Classification Search
CPC .... A61G 5/0866; A61G 5/1094; A61G 3/005; B62B 3/022; B62B 5/085; B62B 7/10; B62B 9/102; B62B 9/28; B62B 2206/02; B62B 2206/003; B60P 3/423; A61H 3/04; A61H 2003/043
See application file for complete search history.

(56) References Cited

U.S. PATENT DOCUMENTS

| | | | | |
|---|---|---|---|---|
| 5,944,338 | A * | 8/1999 | Simpson | A61G 5/006 |
| | | | | 280/650 |
| 6,203,053 | B1 * | 3/2001 | Sohrt | A61H 3/04 |
| | | | | 248/129 |
| 6,340,168 | B1 * | 1/2002 | Woleen | A61G 5/08 |
| | | | | 135/66 |
| 9,211,000 | B1 * | 12/2015 | Storkel | A61H 3/04 |
| 2001/0005073 | A1 * | 6/2001 | Choi | A61G 5/0883 |
| | | | | 280/647 |
| 2004/0094999 | A1 * | 5/2004 | Volotsenko | A47C 13/00 |
| | | | | 297/188.1 |
| 2006/0255642 | A1 * | 11/2006 | Epaud | B60N 2/757 |
| | | | | 297/411.38 |
| 2007/0096436 | A1 * | 5/2007 | Willis | A61G 5/0866 |
| | | | | 280/650 |
| 2009/0315300 | A1 * | 12/2009 | Stiba | B62B 9/28 |
| | | | | 280/648 |
| 2010/0084831 | A1 * | 4/2010 | Wang | B60N 2/3065 |
| | | | | 280/39 |
| 2015/0217792 | A1 * | 8/2015 | Stiba | B62B 9/20 |
| | | | | 280/650 |
| 2018/0338876 | A1 * | 11/2018 | Baer | A61G 5/1059 |
| 2019/0168658 | A1 * | 6/2019 | Keziah | B60N 2/36 |
| 2020/0008990 | A1 * | 1/2020 | Harrison | B62K 13/06 |

FOREIGN PATENT DOCUMENTS

| | | | |
|---|---|---|---|
| JP | H 10-248879 | 9/1998 | |
| JP | 2000-005239 | 1/2000 | |
| JP | 2001-048497 | 2/2001 | |
| JP | 2005-328914 | 12/2005 | |
| JP | 2006-103512 | 4/2006 | |
| JP | 2009-183407 | 8/2009 | |
| JP | 2016-168153 | 9/2016 | |
| WO | WO-2015053677 A1 * | 4/2015 | ............ B62K 5/025 |

* cited by examiner

ELECTRIC VEHICLE WITH MOVABLE BAGGAGE BASE

FIELD OF THE INVENTION

The present invention relates to an electric vehicle that can be used in a state in which baggage is placed on a moving base capable of traveling by using an electromotive drive.

BACKGROUND OF THE INVENTION

As a moving means for users, such as elderly people, people needing care, or the like, electric vehicles, such as electric wheelchairs, electric carts, or the like which are capable of traveling by using a driving means, such as motors or the like are now widely used. The electric vehicle may sometimes be referred to as a "senior car". Typically, the electric vehicle includes a moving base configured so as to be capable of traveling by electromotive drive, and a seat having a seating part and disposed on the moving base, so that the user can move in a state of being seated on the seating part of the seat of the electric vehicle.

The electric vehicle may be configured so as to be foldable. Specifically, the electric vehicle may be configured so as to be changeable between an unfolded state in which the moving base is expanded in the front-rear direction to allow the user to ride thereon and to achieve stability during traveling, and a folded state in which the moving base is contracted in the front-rear direction to make the electric vehicle suitable for a movement by being pushed from the rearward thereof. The electric vehicle of such a configuration is required to be movable by being pushed with baggage placed thereon in the folded state. Therefore, various structures for placing baggage in the electric vehicles are proposed.

In an example of the electric vehicle with the structure for placing baggage, to be presented, the electric vehicle includes: a vehicle body having front wheels and rear wheels, and being configured so as to allow a wheel base to expand and contract; a seat having a seating part and being configured so as to be disposed on the vehicle body; a seat back located rearward of the seat and formed into an inverted U-shape in front view; a basket permanently provided so as to allow baggage to be stored and formed so as to have a U-shape opening upward in cross section; and a handle configured so as to control the electric vehicle and stay at a certain position, in which when the electric vehicle is in an unfolded state, the seating part is disposed so as to allow the user to operate a handle in a state of being seated on the seating part of the seat, the seat back is disposed so as to stand upward from a rear of the seating part, the basket is disposed at a lower part of the vehicle body, when the electric vehicle is in a folded state, the seating part and the basket are disposed above the positions thereof in the unfolded state, and the seat back is configured so as to fall over the seating part. (For example, see JP 2016-168153 A).

BRIEF SUMMARY OF THE INVENTION

However, in the example of the electric vehicle described above, the basket is permanently provided so as to allow baggage to be stored, and a space for installing the basket results in an increase in size of the electric vehicle. In particular, in view of an improvement of the electric vehicle in capability of moving in a zippy manner, the increase in size of the electric vehicle is a problem. If the basket is reduced in size in view of size reduction of the electric vehicle, sufficient storage space for baggage cannot be provided. In this case, in particular, a rigid shopping basket provided in supermarkets, shopping centers, or the like, cannot be placed stably on the electric vehicle, and the shopping basket cannot be carried stably by the electric vehicle. On the other hand, the electric vehicle is also required to allow the user to stably ride thereon. The electric vehicle is also required to improve convenience.

In the example of the electric vehicle described above, it can be considered to move the electric vehicle by pushing while placing baggage, such as the shopping basket, on the seating part of the electric vehicle in the unfolded state. However, the baggage on the seating part cannot be held stably, and the baggage cannot be carried stably by the electric vehicle in the unfolded state. In addition, there is a problem in that the electric vehicle in the unfolded state has a large size, and is difficult to move in a zippy manner.

Accordingly, it is desirable to configure the electric vehicle so as to be capable of being reduced in size, capable of allowing the user to stably ride thereon, and capable of placing and carrying the baggage stably. Furthermore, it is desirable that the electric vehicle be improved in convenience.

To solve the above-described problem, an electric vehicle according to an aspect includes: a moving base configured so as to be capable of traveling by electromotive drive; a seat including a seating part having a seating surface, the seat disposed on the moving base; and a back plate configured so as to be capable of being used as a seat back corresponding to the seating surface, the back plate disposed on the moving base, in which the seat is configured so as to be movable between a seating position in which the seating surface of the seating part faces upward, and a retracting position in which the seating part is retracted forward from the seating position, the back plate is configured so as to be movable between a standing-up position located rearward and upward with respect to the seating part of the seat when at the seating position, and a lying-down position located forward of the standing-up position, and the back plate includes a baggage carrier formed so as to allow baggage to be placed thereon, on a back surface facing upward when at the lying-down position.

In the electric vehicle according to the aspect, the electric vehicle can be reduced in size, the user can ride stably thereon, and the baggage can be stably placed thereon and carried. Furthermore, the electric vehicle of the aspect can be improved in convenience.

DETAILED DESCRIPTION OF THE INVENTION

The electric vehicle according to an Embodiment will be described below. The electric vehicle may have a single seat, and in addition, the electric vehicle may be configured so as to open the seat provided thereon to the outside of mobile object. For example, the electric vehicle may be an electric wheelchair, an electric cart, and/or the like, and, in particular, the electric vehicle may be a single-seat wheelchair, a single-seat electric cart, and/or the like. However, the electric vehicle is not limited to these configurations. Hereinafter, the electric vehicle is simply called a "vehicle", if necessary.

Figure 1:
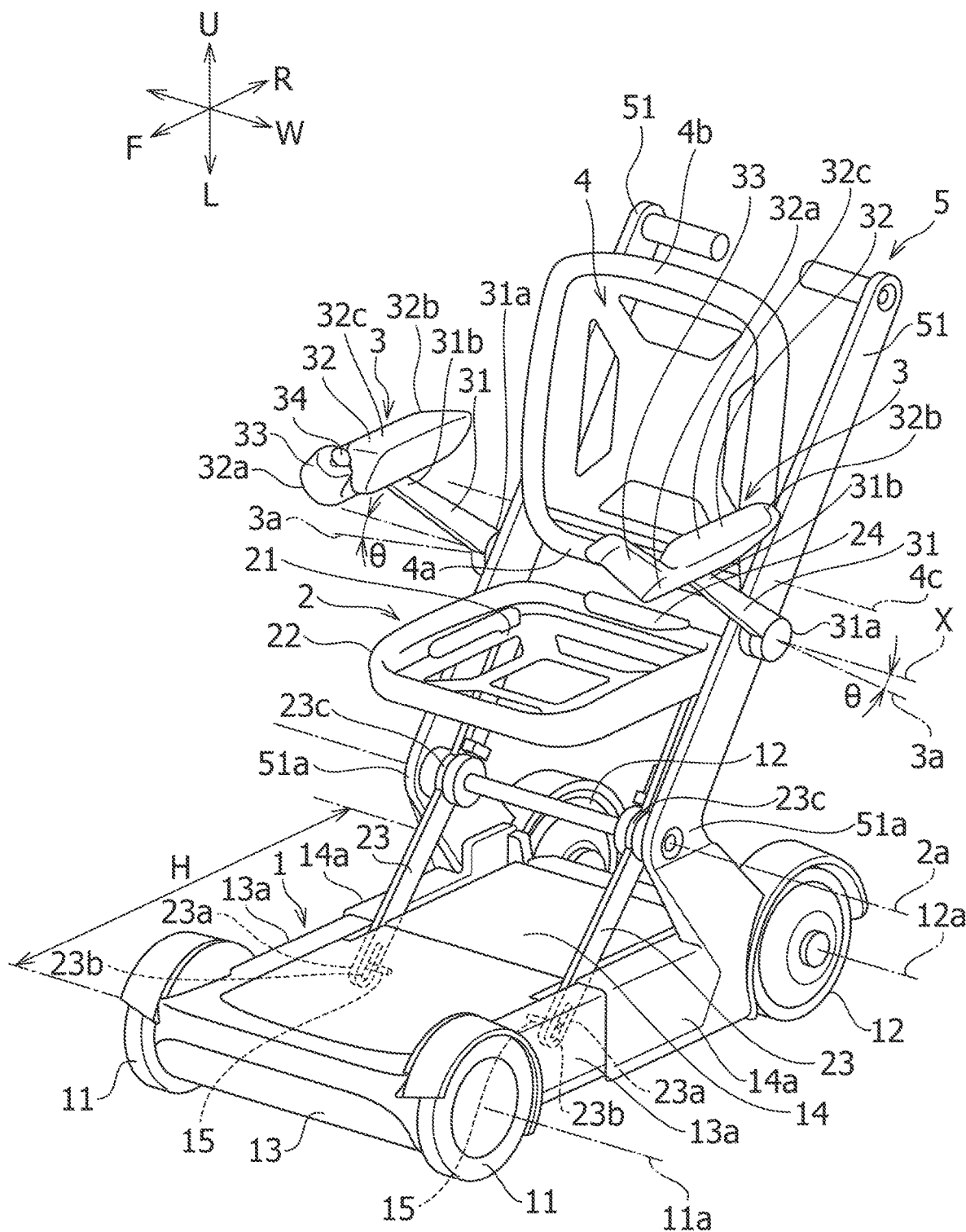
FIG. 1 is a front perspective view schematically showing an electric vehicle according to an Embodiment with a moving base in an expanded state, a seat in a seating position, an armrest being at a position of use, and a back plate in a standing-up position.
Figure 3:
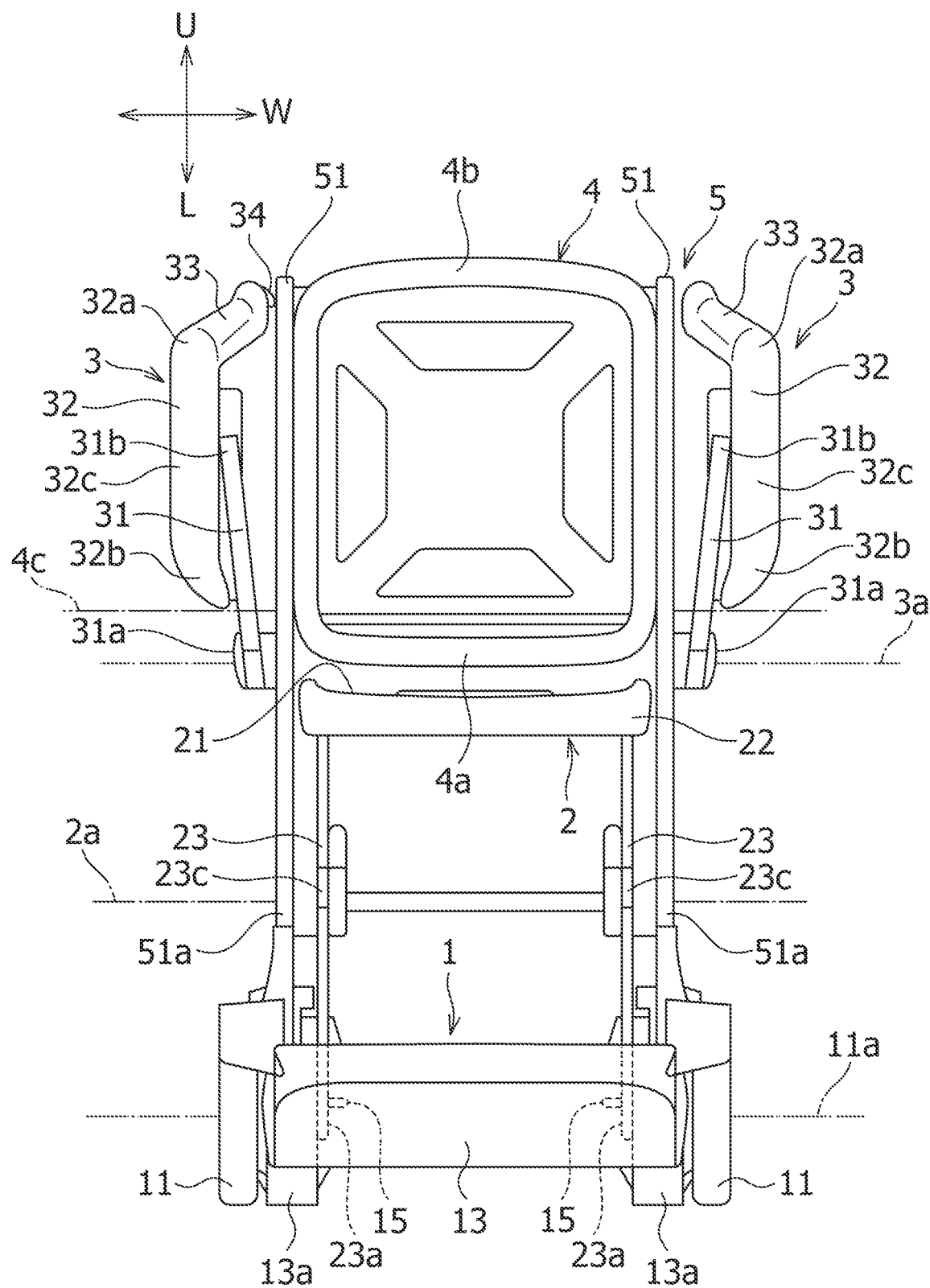
FIG. 3 is a front view schematically showing the electric vehicle according to the Embodiment with the moving base in the expanded state, the seat in the seating position, the armrest being at a lift-up position, and the back plate in the standing-up position.
Figure 4:
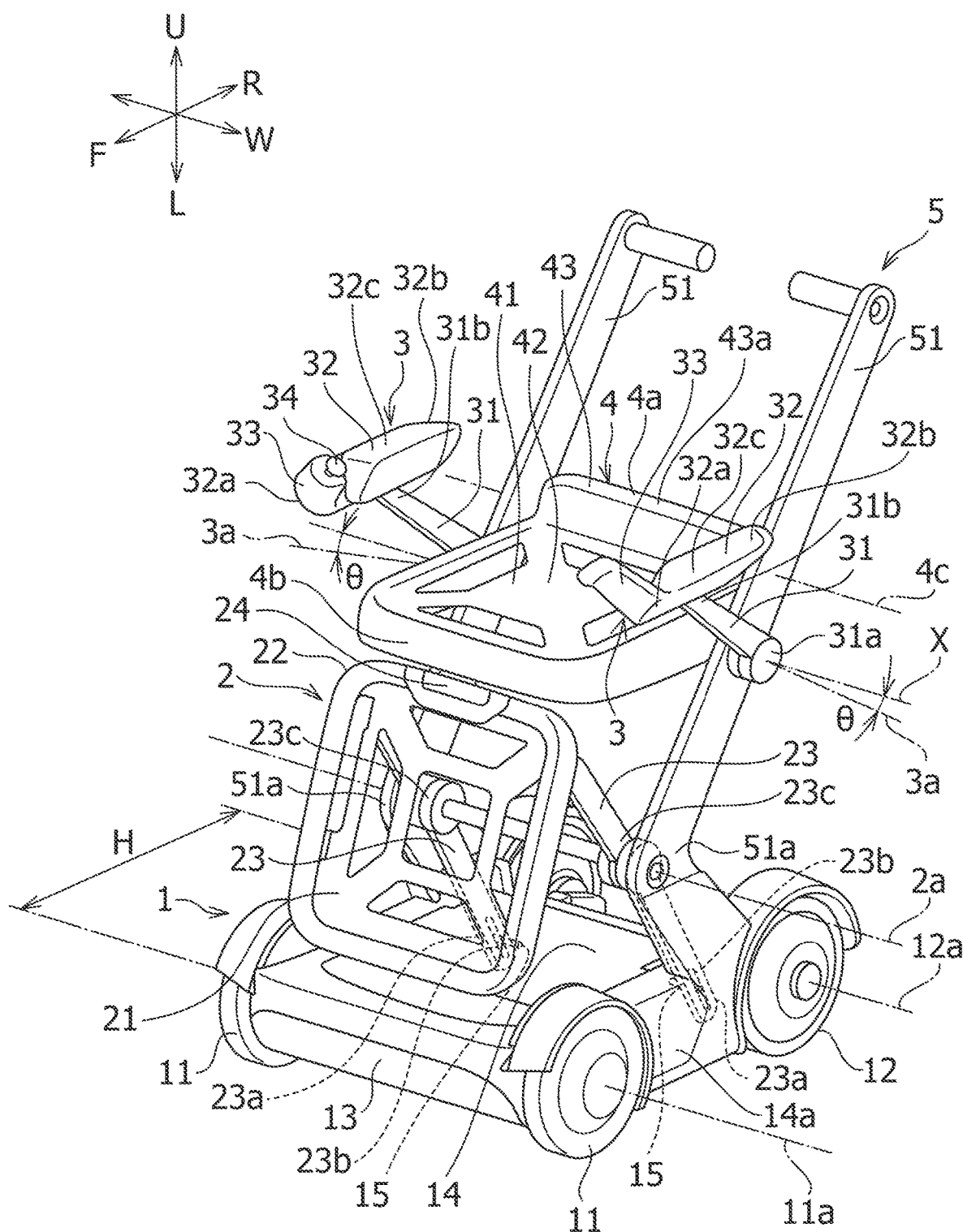
FIG. 4 is a front perspective view schematically showing an electric vehicle according to the Embodiment with a moving base in a contracted state, a seat in a retracting position, the armrest being at a position of use, and a back plate in a lying-down position.
Figure 5:
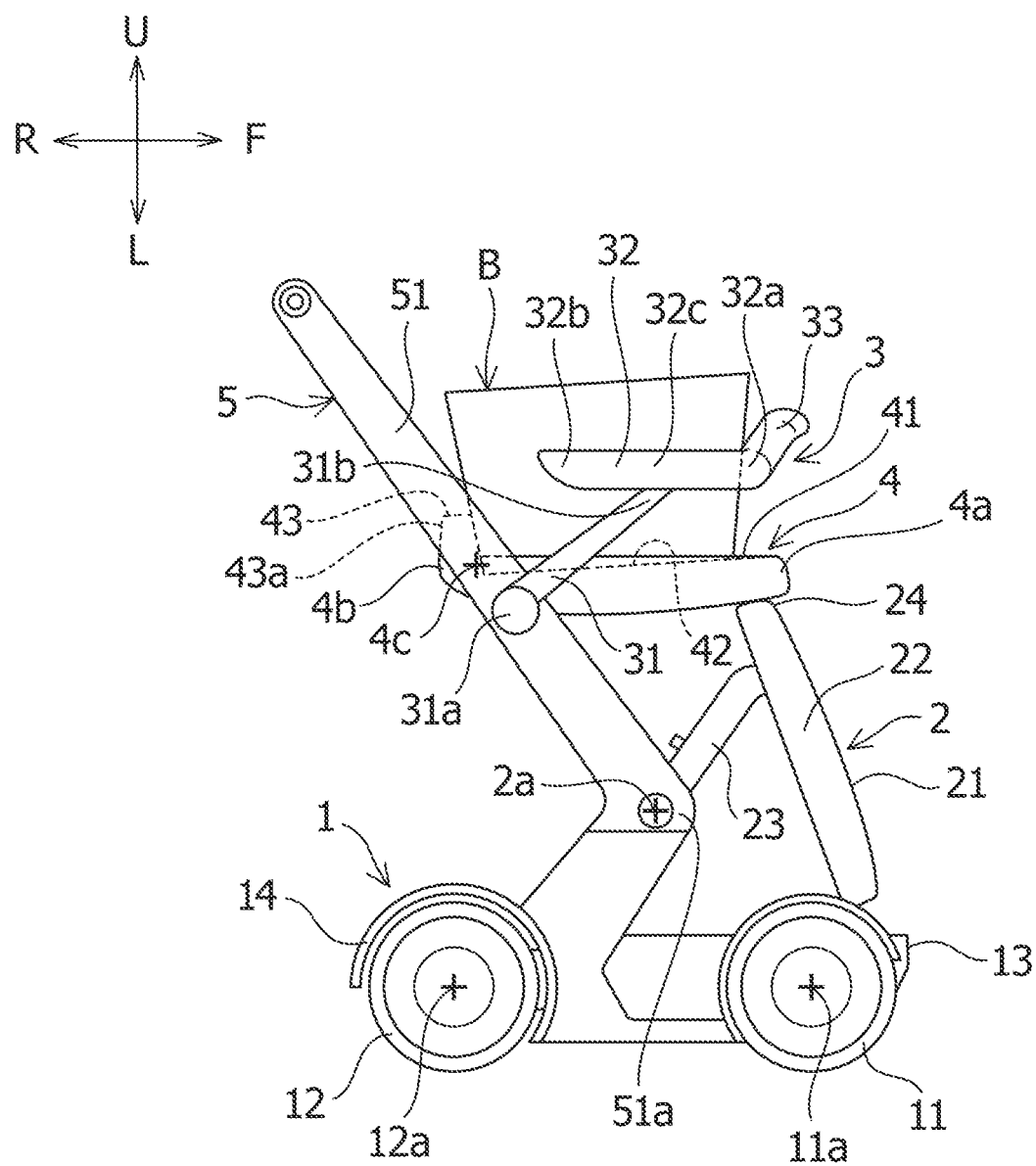
FIG. 5 is a side view schematically showing an electric vehicle according to the Embodiment with a moving base in a contracted state, a seat in a retracting position, the armrest being at a position of use, a back plate in a lying-down position, and the baggage placed on the baggage carrier on the back plate.

Note that in FIGS. 1, 4 and 5 of the drawings used in the description of the present Embodiment, a vehicle front and a vehicle rear are respectively indicated by an arrow F and an arrow R. That is to say, the vehicle front-rear direction is indicated by the arrow F and the arrow R. In FIGS. 1 to 4, a vehicle width direction is indicated by an arrow W. In FIGS. 1 to 5, a vehicle upper side and a vehicle lower side are respectively indicated by an arrow U and an arrow L. That is to say, a vehicle upper-lower direction is indicated by the arrow U and the arrow L.

Overview of Electric Vehicle

The electric vehicle of the present Embodiment will be schematically described. As shown in FIG. 1 to FIG. 5, the vehicle includes a moving base 1 configured so as to be capable of traveling by electromotive drive. The moving base 1 includes two front wheels 11, and two rear wheels 12 which are located in the vehicle rear at a distance from the front wheels 11. The front wheels 11 and the rear wheels 12 serve as traveling wheels of the vehicle. However, the moving base may have at least one front wheel and two or more rear wheels, or may have two or more front wheels and at least one rear wheel.

The vehicle includes a seat 2 disposed on the moving base 1. The seat 2 includes a seating part 22 having a seating surface 21 configured so as to allow the user to be seated. In particular, the seat 2 may have a single-seater configuration. However, the seat of the vehicle is not limited thereto.

The vehicle includes an armrest 3 located outwards of the seating surface 21 in a width direction of the vehicle. In particular, the vehicle may have two armrests 3. The two armrests 3 may be positioned outwards of the seating surface 21 in the width direction of the vehicle. However, the vehicle may be configured so as to have at least one armrest.

The vehicle includes a back plate 4 configured so as to be capable of being used as a seat back corresponding to the seating surface 21 of the seat 2. The back plate 4 is also disposed on the moving base 1.

Figure 2:
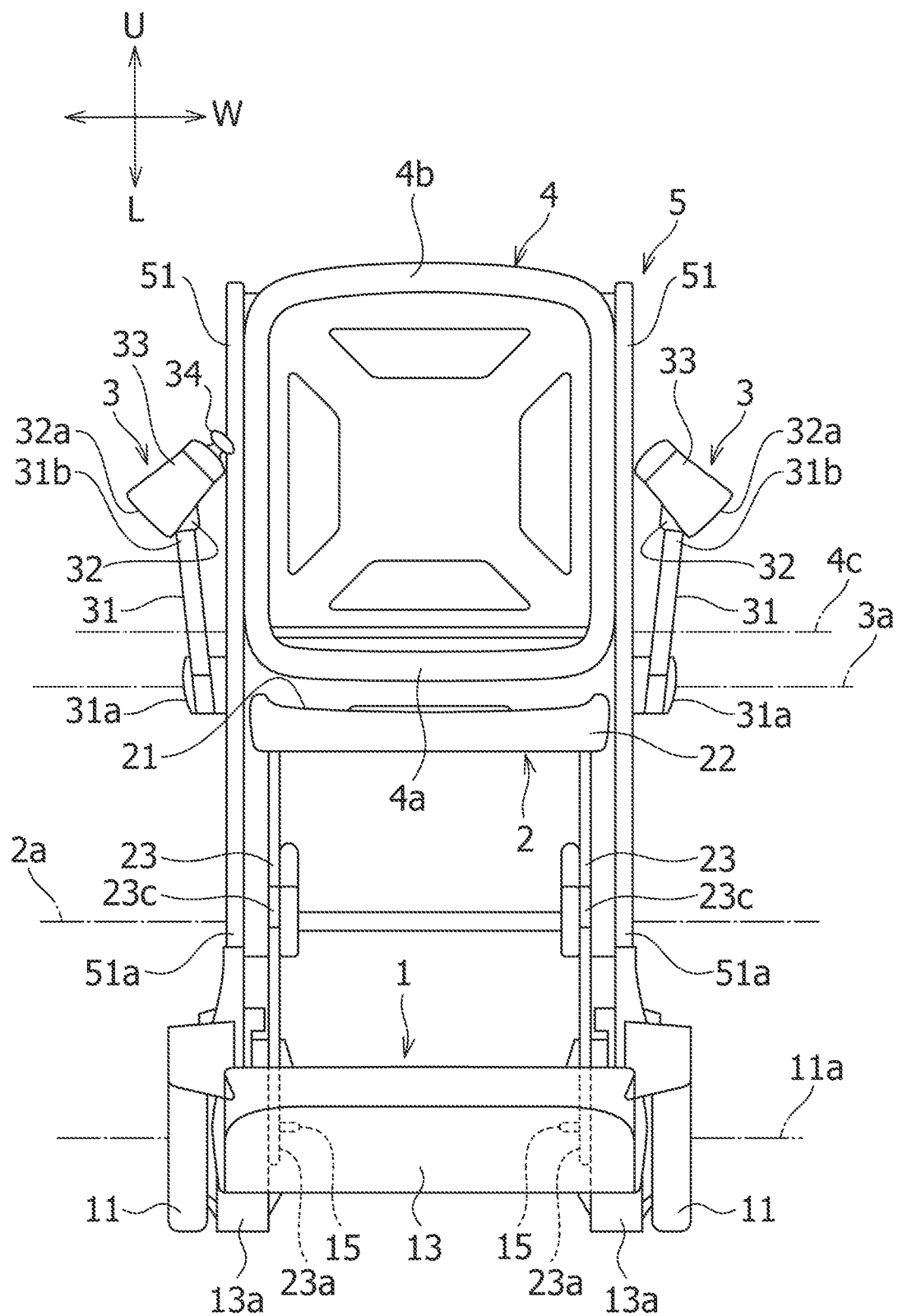
FIG. 2 is a front view schematically showing the electric vehicle according to the Embodiment with the moving base in the expanded state, the seat in the seating position, the armrest being at the position of use, and the back plate in the standing-up position.

The seat 2 is configured so as to be movable between the seating position in which the seating part 22 is positioned with the seating surface 21 facing the vehicle upper as shown in FIGS. 1 to 3, and the retracting position in which the seating part 22 is retracted from the seating position to the vehicle front as shown in FIGS. 4 and 5. The back plate 4 is configured so as to be movable between a standing-up position located in the vehicle rear and the vehicle upper with respect to the seating part 22 of the seat 2 when at the seating position as shown in FIGS. 1 to 3, and a lying-down position located in the vehicle front of the standing-up position as shown in FIGS. 4 and 5. As shown in FIGS. 4 and 5, the back plate 4 includes a baggage carrier 41 formed so as to allow a baggage B (shown in FIG. 5) to be placed thereon, on a back surface facing toward the vehicle upper when at the lying-down position.

In addition, the vehicle may be configured as follows. As shown in FIG. 4, the baggage carrier 41 includes a placing surface 42 formed so as to allow the baggage B to be placed thereon when the back plate 4 is at the lying-down position, and a baggage stop 43 projecting from at least part of an outer peripheral edge portion of the placing surface 42. Furthermore, as shown in FIG. 5, in a state in which the back plate 4 is at the lying-down position, the placing surface 42 inclines so as to be lowered as the placing surface 42 goes from the vehicle front to the vehicle rear, and the baggage stop 43 includes a rear baggage stop part 43a protruding from a rear edge portion of the placing surface 42 in the vehicle front-rear direction. Note that although detailed description will be given later, the baggage stop may have another baggage stop part instead of, or in addition to, the rear baggage stop part.

As shown in FIGS. 1 to 5, the armrests 3 are disposed in the vehicle upper with respect to the back plate 4 at the lying-down position. The armrests 3 each include a supporting part 31 supported on the moving base 1 and a body part 32 supported by the supporting part 31. The body part 32 is also supported on the moving base 1. The armrests 3 each include a grip 33 protruding from the body part 32. Specifically, as shown in FIGS. 1 and 5, the grip 33 protrudes from the body part 32 toward the seat 2 so as to allow the user seated on the seating surface 21 of the seat 2 to hold the grip 33 when the seat 2 is at the seating position, and protrudes from the body part 32 toward the baggage carrier 41 of the back plate 4 when the back plate 4 is at the lying-down position.

The moving base 1 includes a front base 13 having the front wheels 11 and a rear base 14 having the rear wheels 12. The rear base 14 is disposed at the vehicle rear with respect to the front base 13. Referring to FIGS. 1 to 4, the front and rear bases 13 and 14 of the moving base 1 are configured so as to be movable relative to each other to allow the wheel base H between the front wheels 11 and the rear wheels 12 to be expanded and contracted. However, the moving base may be configured so as to keep the wheel base unchanged. In other words, the moving base may be configured so as not to allow the wheel base to be expanded and contracted.

The movement of the seat 2 between the seating position and the retracting position is interlocked with the relative movement between the front and rear bases 13 and 14. The vehicle includes a frame 5 disposed on the rear base 14.

Details of Moving Base

The moving base 1 may be configured in detail as follows. By the relative movement of the front and rear bases 13 and 14, the moving base 1 can be changed between the expanded state in which the wheel base H is expanded as shown in FIG. 1, and the contracted state in which the wheel base H is contracted so as to shorten the length of the wheel base H compared to the length in the expanded state as shown in FIG. 4. In addition, the moving base 1 described above is configured so as to allow the rear wheels 12 to be driven and make the front wheels 11 stopped for expanding and contracting the wheel base H. In other words, when expanding the wheel base H, the rear wheels 12 are driven to rotate to move the rear base 14 toward the vehicle rear and the front wheels 11 are stopped to immobilize the front base 13 at a certain position. In contrast, when contracting the wheel base H, the rear wheels 12 are driven to rotate to move the rear base 14 toward the vehicle front, and the front wheels 11 are stopped to immobilize the front base 13 at a certain position.

However, the moving base may be configured in such a manner that the front wheels are driven and the rear wheels are stopped in order to expand and contract the wheel base. The moving base may be configured in such a manner that the front wheels and the rear wheels are driven to rotate in the opposite directions from each other in order to expand and contract the wheel base.

Referring to FIG. 1 and FIG. 4, the front and rear bases 13 and 14 of the moving base 1 are configured so as to be substantially linearly slidable relative to each other in the vehicle front-rear direction. In particular, the difference in length of the wheel base H between the expanded state and the contracted state of the moving base 1 may be at least a half the maximum length of the seat 2 in the seat front-rear direction and not longer than the maximum length of the seat 2. Note that the seat front-rear direction is substantially orthogonal to the seat width direction, and is a direction extending between the front surface and the back surface of the seating part 22. Note that the seat width direction is substantially aligned with the vehicle width direction. The vehicle can travel stably while stably supporting a user riding thereon when the moving base 1 is in the expanded state, and the vehicle can move in a zippy manner when the moving base 1 is in the contracted state.

As shown in FIGS. 1 to 5, the front base 13 of the moving base 1 includes two anterior side members 13a disposed at a distance from each other in the vehicle width direction. The two front wheels 11 are respectively attached to the two anterior side members 13a at front end portions in the vehicle front-rear direction so as to be rotatable about an axis of rotation 11a extending in the vehicle width direction.

Each of the anterior side members 13a is provided with a pivot shaft 15 at a rear end portion thereof in the vehicle front-rear direction so as to protrude therefrom in the vehicle width direction. As will be described in detail later, a leg part 23 of the seat 2 is attached to the pivot shaft 15. Both of the pivot shafts 15 are disposed so as to avoid interference with the rear base 14 when the front and rear bases 13 and 14 move relative to each other.

As shown in FIG. 1, the pivot shafts 15 may be positioned at front end portions of the posterior side members 14a in the vehicle front-rear direction when the moving base 1 is in the expanded state. The pivot shafts 15 may be positioned in the vicinity of the rear wheels 12 when the moving base 1 is in the contracted state.

In addition, the rear base 14 of the moving base 1 includes two posterior side members 14a disposed at a distance from each other in the vehicle width direction. The two rear wheels 12 are respectively attached to the two posterior side members 14a at rear end portions in the vehicle front-rear direction so as to be rotatable about an axis of rotation 12a extending in the vehicle width direction.

Although not particularly shown, a battery serving as a power supply source for the vehicle and a control device for electrically controlling the vehicle are mounted on the moving base 1. A braking device is mounted on the front base 13 of the moving base 1 so as to be capable of braking the two front wheels 11. Drive motors for driving the rear wheels 12 to rotate are mounted on the rear base 14 of the moving base 1. For example, the drive motors may be disposed to be adjacent to the respective rear wheels 12 in the vehicle width direction, or the drive motors may be built in the respective rear wheels 12. However, the drive motor is not limited thereto.

In the vehicle configured in this manner, the braking device, the control device, and the drive motors are electrically connected to the battery, respectively. The battery is capable of supplying power to the braking device, the control device, and the drive motors, respectively. The control device is connected to the braking device and the drive motors respectively. The control device is capable of controlling the braking device, the battery, and the drive motors, respectively.

Details of Seat

The seat 2 may be configured in detail as follows. As shown in FIGS. 1 to 5, the seat 2 further includes two leg parts 23 capable of supporting the seating part 22. The two leg parts 23 are disposed at a distance from each other in the seat width direction. However, the seat may be configured so as to have at least one leg part.

Referring to FIGS. 1 to 5, the seating part 22 of the seat 2 is configured so as to move toward the vehicle front along with the movement of the leg part 23 in association with the relative movement of the front and rear bases 13 and 14 the vehicle front-rear direction for contracting the wheel base H. The seating part 22 is configured so as to move toward the vehicle rear along with the movement of the leg part 23 in association with the relative movement of the front and rear bases 13 and 14 the vehicle front-rear direction for expanding the wheel base H.

As shown in FIGS. 1 to 3, the seating part 22 can be disposed at the seating position when the moving base 1 is in the expanded state. The seat 2 at the seating position may be disposed such that the seating surface 21 of the seating part 22 extends substantially along a vehicle horizontal direction.

As shown in FIG. 4, the seat 2 is positioned in the retracting position when the moving base 1 is in the contracted state. The seat 2 may be arranged such that the seating surface 21 of the seating part 22 is directed at a predetermined angle with respect to a plane extending in the vehicle upper-lower direction and the vehicle width direction when the seating part 22 is in the retracting position. The predetermined angle may be approximately 30 degrees or less in absolute value. However, the angle of the seating surface is not limited thereto.

As shown in FIGS. 1 to 5, a front end region of the seating part 22 in the seat front-rear direction is a free end. In a state in which the seat 2 is in the seating position, the front end region of the seating part 22 is located at the vehicle front with respect to a rear end region of the seating part 22 in the seat front-rear direction, and the rear end region of the seating part 22 is positioned so as to substantially be aligned with the frame 5 in the vehicle front-rear direction. In a state in which the seat 2 is in the retracting position, the rear end region of the seating part 22 is located at the vehicle upper side with respect to the front end region of the seating part 22, and is positioned at a distance to the vehicle front with respect to the frame 5.

In addition, as shown in FIGS. 4 and 5, the seat 2 is also provided with a back plate supporting mechanism 24 configured so as to support the back plate 4 in a state in which the seat 2 and the back plate 4 are in the retracting position and in the lying-down position respectively. The back plate supporting mechanism 24 corresponds to the rear end region of the seating part 22 in the seat front-rear direction. However, the invention is not limited thereto.

Each of the leg parts 23 extends so as to be inclined from the rear to the front in the seat front-rear direction as it goes from the upper to the lower in the seat upper-lower direction. Note that the seat upper-lower direction is substantially orthogonal to the seat width direction and the seat front-rear direction. Each of the leg parts 23 may also extend downward in the seat upper-lower direction from a side end region of the seating part 22 in the seat width direction on a side corresponding to each of the leg parts 23.

Each of the leg parts 23 includes a base attaching region 23a configured so as to attach the leg part 23 to the front base 13. The base attaching region 23a is attached to the pivot shaft 15 of the anterior side member 13a so as to be pivotable. More specifically, the base attaching region 23a is provided with an attaching long hole 23b penetrating therethrough in the vehicle width direction so as to allow insertion of the pivot shaft 15 therethrough. The attaching long hole 23b extends along the longitudinal direction of the leg part 23. When the front base 13 moves in the vehicle front-rear direction with respect to the rear base 14, the pivot shaft 15 moves in the longitudinal direction of the attaching long hole 23b in the attaching long hole 23b.

Each of the leg parts 23 has a frame attaching region 23c for attaching the leg part 23 to the frame 5 so as to be pivotable with respect to the frame 5. The frame attaching region 23c is positioned between the seating part 22 and the base attaching regions 23a. The base attaching regions 23a of each of the leg parts 23 may be located at a lower end of the leg part 23 in the seat upper-lower direction, and the frame attaching region 23c of each of the leg parts 23 may be located in an intermediate region of the corresponding leg part 23 in the seat upper-lower direction.

In the seat 2 configured in this manner, the movement of the seating part 22 toward the vehicle front is achieved by the movement of the base attaching regions 23a of the leg parts 23 to the vehicle rear in association with the relative movement of front and rear bases 13 and 14 with each other in the vehicle front-rear direction for contracting the wheel base H and the pivotal movement of the leg parts 23 toward the vehicle front. The seating part 22 can be moved from the seating position to the retracting position by the movement thereof toward the vehicle front.

The relative movement of the front and rear bases 13 and 14 in the vehicle front-rear direction for expanding the wheel base H, causes the movement of the base attaching regions 23a of the leg parts 23 toward the vehicle front, and the pivotal movement of the leg parts 23 toward the vehicle rear, whereby the movement of the seating part 22 toward the vehicle rear is achieved. The seat 2 can move from the retracting position to the seating position by the movement thereof toward the vehicle rear.

Details of Armrests

The armrests 3 may be configured in detail as follows. As shown in FIGS. 1 to 5, the armrests 3 may be positioned in the vehicle upper side with respect to the seating part 22. The supporting parts 31 of the two armrests 3 are respectively attached to two posts 51 of the frame 5, described later, such that the two armrests 3 are pivotable about the pivot axes 3a respectively.

The armrests 3 are configured so as to be changeable in position between the position of use and the lift-up position. Specifically, as shown in FIGS. 1, 2, 4 and 5, the armrests 3 at the position of use are disposed so as to allow the user seated on the seating surface 21 to hold the grips 33 while placing the arms in the vehicle upper with respect to the armrests 3. As shown in FIG. 3, the armrests 3 are disposed at the lift-up position so as to lift up the grips 33 toward the vehicle upper with respect to the position of use. Referring to FIGS. 1 to 5, the grips 33 positioned at the lift-up position, are located outward of the grips 33 at the position of use in the width direction of the vehicle.

As shown in FIGS. 1 to 5, the supporting part 31 of each of the armrests 3 is supported so as to be pivotable about a pivot axis 3a between the position of use and the lift-up position of the armrests 3. As shown in FIGS. 1 and 4, the pivot axis 3a is inclined from a center in a width direction of the vehicle outward in the width direction of the vehicle as it goes from the vehicle rear to the vehicle front. As shown in FIGS. 1 to 5, in a state in which the armrests 3 are at the position of use, the grips 33 protrude from the body parts 32 of the armrests 3 so as to incline from an outer side in the width direction of the vehicle toward the center of the vehicle in the width direction as it goes from the vehicle lower toward the vehicle upper.

The supporting part 31 of each of the armrests 3 may have a supporting region 31a to be attached so as to be pivotable to the post 51 corresponding to this armrest 3. In addition, in each of the armrests 3, the supporting part 31 may be provided at a connecting region 31b to be connected to the body part 32. The supporting region 31a and the connecting region 31b of the supporting part 31 are positioned at a distance from each other. The supporting region 31a is positioned in the vehicle lower side with respect to the connecting region 31b. The supporting part 31 of the armrest 3 is positioned in the vehicle upper side with respect to the base end part 4a of the back plate 4.

The body part 32 of each of the armrests 3 has a leading end region 32a and a base end region 32b which face each other, and an intermediate region 32c which extends between the leading end region 32a and the base end region 32b. The grip 33 protrudes from a leading end region 32a of the body part 32. When each of the armrests 3 is in the position of use, the leading end region 32a of the body part 32 of the armrest 3 is positioned in the vehicle front with respect to the base end region 32b.

When each of the armrests 3 is in the lift-up position, the leading end region 32a of the body part 32 of the armrest 3 is positioned in the vehicle upper side with respect to the base end region 32b. In particular, when each of the armrests 3 is in the lift-up position, the supporting part 31, the body part 32, or the grip 33 of the armrest 3 may be positioned so as to be substantially aligned with the back plate 4 in the standing-up position in the vehicle front-rear direction, or may be positioned in the vehicle rear with respect to the back plate 4 in the standing-up position.

The grip 33 on one of the two armrests 3 includes an operation part 34 configured so as to allow the vehicle to be operable. In particular, the operation part 34 may be configured so as to allow the user to operate with one hand. The operation part 34 may be a joystick. However, each of the grips of the two armrests may have the operation part. The operation part is not limited thereto, and may be a button, a touch-sensitive board, a lever, a dial-type knob, and/or the like.

The pivot axis 3a of each of the armrests 3 may pass through the supporting region 31a of the supporting part 31, and incline toward the vehicle front with respect to the axial line X in the width direction extending in the vehicle width direction by an angle of inclination θ. The angle of inclination θ may be the same for the two armrests 3. The angle of inclination θ may fall within a range from approximately 5 degrees to approximately 15 degrees. For example, the angle of inclination θ may be approximately 10 degrees. However, the angle of inclination is not limited thereto, and the angle of inclination of two of the armrests may be different. The angle of inclination may be set to allow a user in a state of being seated on the seating surface of the seat to pivot the armrests between the position of use and the lift-up position.

In addition, the pivot axis 3a may be positioned along the horizontal plane. However, the pivot axis is not limited thereto, and the pivot axis may be inclined toward the vehicle upper side or the vehicle lower side with respect to the horizontal plane.

Details of Back Plate

The back plate 4 may be configured in detail as follows. Referring to FIGS. 1 and 4, the back plate 4 is attached to the frame 5 so as to be pivotable between the standing-up position and the lying-down position. As shown in FIG. 1, the back plate 4 is disposed along a plane extending in the vehicle width direction and the vehicle upper-lower direction in a state of being at the standing-up position. As shown in FIG. 4, the back plate 4 is disposed such that the placing surface 42 is inclined to be lowered from the vehicle front to the vehicle rear as described above in a state of being at the lying-down position. The back plate 4 at the lying-down position is located at the vehicle lower and at about the center in the width direction of the vehicle with respect to the armrests 3 in the position of use.

As shown in FIGS. 1 to 5, the back plate 4 is formed into a substantially flat plate shape. The back plate 4 in the standing-up position includes a base end part 4a and a leading end part 4b located on the lower end side and the upper end side, respectively, in the vehicle upper-lower direction. The base end part 4a of the back plate 4 may be attached to two posts 51 of the frame 5, described later, such that the back plate 4 is pivotable about the pivot axis 4c extending in the vehicle width direction. More specifically, the base end part 4a of the back plate 4 is attached to an intermediate portion of the posts 51 in the vehicle upper-lower direction.

The leading end part 4b of the back plate 4 is a free end. The leading end part 4b of the back plate 4 configured as described above, is pivotable about the pivot axis 4c between the standing-up position and the lying-down position. In addition, as shown in FIGS. 4 and 5, in a state in which the seat 2 is in the retracting position and the back plate 4 is in the lying-down position, the leading end part 4b of the back plate 4 is supported by the back plate supporting mechanism 24 of the leg parts 23 of the seat 2.

Details of Frame

Referring further to FIGS. 4 and 5, in a state in which the back plate 4 is at the lying-down position, the baggage B can be placed on the placing surface 42 of the baggage carrier 41 of the back plate 4. Typically, the baggage B placed on the placing surface 42 may be the shopping basket, the luggage, and/or the like. Furthermore, the baggage B may be a rigid shopping basket provided in supermarkets, shopping centers, and/or the like. However, the baggage placed on the placing surface is not limited thereto. The baggage may be any object as long as it can be placed on the placing surface. For example, such the baggage may be a cardboard box, a case, and/or the like.

As shown in FIG. 4, the baggage stop 43 includes the rear baggage stop part 43a as described above. However, the baggage stop may have a baggage stop part protruding from part or the entire part of the outer peripheral edge portion of the placing surface. The baggage stop may have a plurality of baggage stop parts apart from each other in the direction of the outer periphery of the placing surface, or may be formed integrally so as to continue in the outer peripheral direction of the placing surface. For example, the baggage stop may have a front baggage stop part protruding from a front edge portion of the placing surface in the vehicle front-rear direction. The baggage stop may have a side baggage stop part protruding from at least one of both side edge portions of the placing surface in the vehicle width direction.

Details of Frame

The frame 5 may be configured in detail as follows. As shown in FIGS. 1 to 5, the frame 5 is disposed so as to be adjacent to a rear end region of the seating part 22 of the seat 2 located at the seating position. The frame 5 has two posts 51 disposed at a distance from each other in the vehicle width direction. The two posts 51 are disposed so as to correspond to the posterior side members 14a of the rear base 14 respectively in the vehicle width direction. The two posts 51 are disposed so as to respectively correspond to the two leg parts 23 of the seat 2 in the vehicle width direction.

A lower end portion of each of the posts 51 in the vehicle upper-lower direction is attached to a rear end portion of the posterior side members 14a corresponding to this post 51 in the vehicle front-rear direction. Each of the posts 51 include a seat pivoting attaching part 51a configured so as to be capable of attaching the frame attaching region 23c of the leg part 23 of the seat 2, which corresponds to this post 51. The frame attaching region 23c configured in this manner is attached to a seat pivoting attaching part 51a so as to be pivotable about the pivot axis 2a extending in the vehicle width direction.

The seat pivoting attaching part 51a is disposed between a front end and a rear end of the rear base 14 in the vehicle front-rear direction. In particular, as shown in FIGS. 1 to 3, the seat pivoting attaching part 51a may be disposed in a lower region in the vehicle upper-lower direction of each of the posts 51 located in the vehicle lower side with respect to the seating part 22 of the seat 2 in the seating position. The lower region of the post 51 may be formed in a bent shape so as to protrude toward the vehicle front in substantially a triangle shape. In this case, the seat pivoting attaching part 51a may be positioned at an apex of the lower region protruding in the substantially triangle shape toward the vehicle front.

Unfolded State and Folded State of Electric Vehicle

The unfolded state and the contracted state of the electric vehicle will be described. As shown in FIG. 1, the vehicle assumes an unfolded state when the moving base 1 is in the expanded state and the seat 2 is in the seating position. When the vehicle is in the unfolded state, the vehicle is capable of traveling by operating an operation part 34 with a user in a riding state. When the vehicle is in the unfolded state, the vehicle is capable of traveling by pushing the vehicle with the user, an assistant, or the like positioned in the vehicle rear. The vehicle in the unfolded state can be used as a wheelchair, a cart, and/or the like.

As shown in FIG. 4, the vehicle assumes the folded state when the moving base 1 is in the contracted state and the seat 2 is at the retracting position. The vehicle in the folded state is also capable of traveling by pushing the vehicle with the user positioned in the vehicle rear. The vehicle in the folded state can be used as a walking assisting vehicle, a shopping cart, a wheeled platform, and/or the like.

As described thus far, the electric vehicle according to the present Embodiment includes the moving base 1, the seat 2, and the back plate 4 as described above, the seat 2 is configured so as to be movable between the seating position and the retracting position, the back plate 4 is configured so as to be movable between the standing-up position and the lying-down position, and the back plate 4 includes the baggage carrier 41 formed on the back surface facing toward the vehicle upper in a state of being at the lying-down position so as to allow the baggage B to be placed thereon.

In the electric vehicle configured as described above, a space (hereinafter, referred to as "seating space") is provided in the vehicle upper with respect to the seating surface 21 so that the user can stably seat on the seating part 22 of the seat 2 when the seat 2 is at the seating position and the back plate 4 is at the standing-up position. Therefore, the user can stably ride on the electric vehicle. On the other hand, when the seat 2 is at the retracting position, and the back plate 4 is at the lying-down position, a space (hereinafter, referred to as "baggage carrier space") is provided in the vehicle upper with respect to the back surface of the back plate 4 so as to allow the baggage B to be placed thereon. Therefore, in order to place the baggage B in the baggage carrier space, the baggage B can be stably placed on the baggage carrier 41 of the back plate 4 at the lying-down position, and furthermore, the baggage B can be stably carried. In addition, by sharing the seating space and the baggage carrier space, the space in the electric vehicle can efficiently be used, and consequently, the electric vehicle can be reduced in size. Therefore, the electric vehicle according to the present Embodiment can be reduced in size, can allow the user to stably ride thereon, and can allow the baggage B to be stably placed and carried. Furthermore, the electric vehicle of the present Embodiment can be improved in convenience.

In the electric vehicle according to the present Embodiment, the baggage carrier 41 includes a placing surface 42 formed so as to allow the baggage B to be placed thereon when the back plate 4 is at the lying-down position, and a baggage stop 43 projecting from at least part of an outer peripheral edge portion of the placing surface 42. Therefore, even when the electric vehicle moves in a state in which the baggage B is placed on the placing surface 42 of the baggage carrier 41, an external force, such as an inertia force and/or the like is applies to the baggage B by the movement of the electric vehicle, and the baggage B is moved by the external force, the baggage stop 43 can prevent dropping of the baggage B from the baggage carrier 41 due to the movement of the baggage B. Accordingly, the electric vehicle according to the present Embodiment is capable of stably placing and carrying the baggage B.

In the electric vehicle according to the present Embodiment, in a state in which the back plate 4 is at the lying-down position, the placing surface 42 of the baggage carrier 41 inclines so as to be lowered as the placing surface 42 goes from the vehicle front to the vehicle rear, and the baggage stop 43 of the baggage carrier 41 includes a rear baggage stop part 43a protruding from a rear edge portion of the placing surface 42. Therefore, even when the baggage B on the placing surface 42 is moving from the vehicle front to the vehicle rear by a forward acceleration of the electric vehicle, the rear baggage stop part 43a can prevent the baggage B from dropping off the baggage carrier 41 due to the movement of the baggage B. In addition, even when the baggage B on the placing surface 42 is moving from the vehicle rear to the vehicle front by a forward deceleration of the electric vehicle, the inclined placing surface 42 can prevent the baggage B from dropping off the baggage carrier 41 due to the movement of the baggage B. Accordingly, the electric vehicle according to the present Embodiment is capable of stably placing and carrying the baggage B.

The electric vehicle according to the present Embodiment includes the armrests 3 located outward of the seating part 22 in the seat width direction, and the armrests 3 are disposed in the vehicle upper with respect to the back plate 4 at the lying-down position. Therefore, the armrests 3 can prevent the baggage B from dropping off the baggage carrier 41 due to the movement of the baggage B in the seat width direction.

In the electric vehicle according to the present Embodiment, each of the armrests 3 includes a body part 32 supported on the moving base 1 and a grip 33 protruding from the body part 32 toward the baggage carrier 41 of the back plate 4 at the lying-down position so that the user seated on the seating surface 21 of the seat 2 at the seating position, can hold the grip 33. In the electric vehicle configured as described above, the grips 33 can be used to be held by the user when the seat 2 is at the seating position and the back plate 4 is at the standing-up position. Therefore, the user can stably ride on the electric vehicle. Therefore, the grips 33 can hold the baggage B on the baggage carrier 41 when the seat 2 is at the retracting position, and the back plate 4 is at the lying-down position. In particular, even when the baggage B on the placing surface 42 is moving from the vehicle rear to the vehicle front by a forward deceleration of the electric vehicle, the grips 33 can prevent the baggage B from dropping off the baggage carrier 41 due to the movement of the baggage B. Accordingly, the electric vehicle according to the present Embodiment is capable of stably placing and carrying the baggage B.

In the electric vehicle according to the present Embodiment, the moving base 1 includes the front base 13 having the front wheels 11, and the rear base 14 disposed in the vehicle rear with respect to the front base 13 and having the rear wheels 12. The front and rear bases 13 and 14 are configured so as to be movable relative to each other so as to make the wheel base H between the front wheels 11 and the rear wheels 12 expandable and contractible, and the movement between the seating position and the retracting position of the seat 2 is interlocked with the relative movement of the front and rear bases 13 and 14. Therefore, the unfolded state of the electric vehicle in which the seat 2 is at the seating position and the moving base 1 is in the expanded state, and the folded state of the electric vehicle in which the seat 2 is at the retracting position and the moving base 1 is in the contracted state, can be switched easily by the manual operation of the seat 2. Therefore, the electric vehicle according to the present Embodiment can be reduced in size, in particular, in the folded state. Furthermore, the electric vehicle of the present Embodiment can be improved in convenience.

While the Embodiment of the invention has been described thus far, the invention is not limited to the Embodiment described above, and the invention may be modified and altered based on the technical concept of the invention.

What is claimed is:

1. An electric vehicle comprising:
a moving base configured so as to be capable of traveling by electromotive drive;
a seat including a seating part having a seating surface, the seat disposed on the moving base; and
a back plate configured so as to be used as a seat back corresponding to the seating surface,
the back plate disposed on the moving base separately from the seat, wherein
the seat is configured so as to be movable between a seating position in which the seating surface of the seating part faces upward, and a retracting position in which the seating part is retracted forward from the seating position, the back plate is configured so as to be movable between a standing-up position located rearward and upward with respect to the seating part of the seat when at the seating position, and a lying-down position located forward of the standing-up position independently of movement of the seat, and the back plate includes a baggage carrier formed so as to allow baggage to be placed thereon, on a back surface facing upward when at the lying-down position.

2. The electric vehicle according to claim 1, wherein the baggage carrier includes a placing surface formed so as to allow the baggage to be placed thereon when the back plate is in the lying-down position, and a baggage stop projecting from at least part of an outer peripheral edge portion of the placing surface.

3. The electric vehicle according to the claim 2, wherein in a state in which the back plate is in the lying-down position, the placing surface of the baggage carrier inclines so as to be lowered as the placing surface goes from the vehicle front to the vehicle rear, and the baggage stop of the baggage carrier includes a rear baggage stop part protruding from a rear edge portion of the placing surface.

4. The electric vehicle according to claim 1, further comprising an armrest located outward of the seat with respect to the seating part in the width direction, wherein the armrest is disposed upward of the back plate at the lying-down position.

5. The electric vehicle according to claim 4, wherein the armrest includes a body part supported on the moving base, and a grip protruding from the body part toward the baggage carrier of the back plate in the lying-down position such that the user seated on the seating surface of the seat at the seating position can hold the grip.

6. The electric vehicle according to claim 1, further comprising:

a back plate supporting mechanism configured so as to support the back plate in the lying-down position, wherein taking a rear end of the seating part of the seat in the seating position in a seat front-rear direction as a rear end region, and taking an upper end of the back plate in the standing-up position in a vehicle upper-lower direction as a leading end part, the back plate supporting mechanism is configured so as to support the leading end part of the back plate in the lying-down position with the rear end region of the seating part of the seat in the retracting position.

7. An electric vehicle comprising:

a moving base configured so as to be capable of traveling by electromotive drive;

a seat including a seating part having a seating surface, the seat disposed on the moving base; and a back plate configured so as to be used as a seat back corresponding to the seating surface, the back plate disposed on the moving base, wherein the seat is configured so as to be movable between a seating position in which the seating surface of the seating part faces upward, and a retracting position in which the seating part is retracted forward from the seating position, the back plate is configured so as to be movable between a standing-up position located rearward and upward with respect to the seating part of the seat when at the seating position, and a lying-down position located forward of the standing-up position, the back plate includes a baggage carrier formed so as to allow baggage to be placed thereon, on a back surface facing upward when at the lying-down position, the moving base includes a front base having a front wheel, and rear base being disposed rearward of the front base and having a rear wheel, the front and rear bases are configured to be movable relative to each other so as to expand and contract a wheel base between the front wheel and the rear wheel, and the movement the seat between the seating position and the retracting positron is interlocked with the relative movement between the front and rear bases.

* * * * *